(12) United States Patent
Yao et al.

(10) Patent No.: US 7,660,079 B2
(45) Date of Patent: Feb. 9, 2010

(54) METHOD AND SYSTEM OF USING A STEP PLATE MECHANICALLY FORMED IN A DISK DRIVE SUSPENSION FLEXURE TO MOUNT A MICRO-ACTUATOR TO THE FLEXURE

(75) Inventors: MingGao Yao, DongGuan (CN);
Masashi Shiraishi, HongKong (CN);
YiRu Xie, DongGuan (CN); FengAn Huang, DongGuan (CN)

(73) Assignee: SAE Magnetics (H.K.) Ltd. (CN)

( * ) Notice: Subject to any disclaimer, the term of this patent is extended or adjusted under 35 U.S.C. 154(b) by 584 days.

(21) Appl. No.: 11/495,619

(22) Filed: Jul. 31, 2006

(65) Prior Publication Data
US 2008/0024933 A1    Jan. 31, 2008

(51) Int. Cl.
*G11B 5/56* (2006.01)
(52) U.S. Cl. ............... 360/294.3; 360/234.6; 360/294.4
(58) Field of Classification Search .............. 360/234.6, 360/245.1, 294.3–294.5
See application file for complete search history.

(56) References Cited

U.S. PATENT DOCUMENTS

| 6,671,131 B2 | 12/2003 | Kasajima et al. |
| 6,700,749 B2 | 3/2004 | Shiraishi et al. |
| 6,747,848 B2 * | 6/2004 | Kasajima et al. ......... 360/245.3 |
| 2004/0095688 A1 * | 5/2004 | Shiraishi et al. .......... 360/294.4 |

FOREIGN PATENT DOCUMENTS

| JP | 2002-74871 | 3/2002 |
| JP | 2002-133803 | 5/2002 |

\* cited by examiner

*Primary Examiner*—A. J. Heinz
(74) *Attorney, Agent, or Firm*—Nixon & Vanderhye P.C.

(57) ABSTRACT

A head gimbal assembly includes a suspension including a suspension flexure. The suspension flexure includes a step plate mechanically formed in the suspension flexure. A micro-actuator is mounted to the step plate of the suspension flexure. The step plate is constructed and arranged to support the micro-actuator such that a substantially constant gap is maintained between a top support of the micro-actuator and the suspension flexure in use.

27 Claims, 17 Drawing Sheets

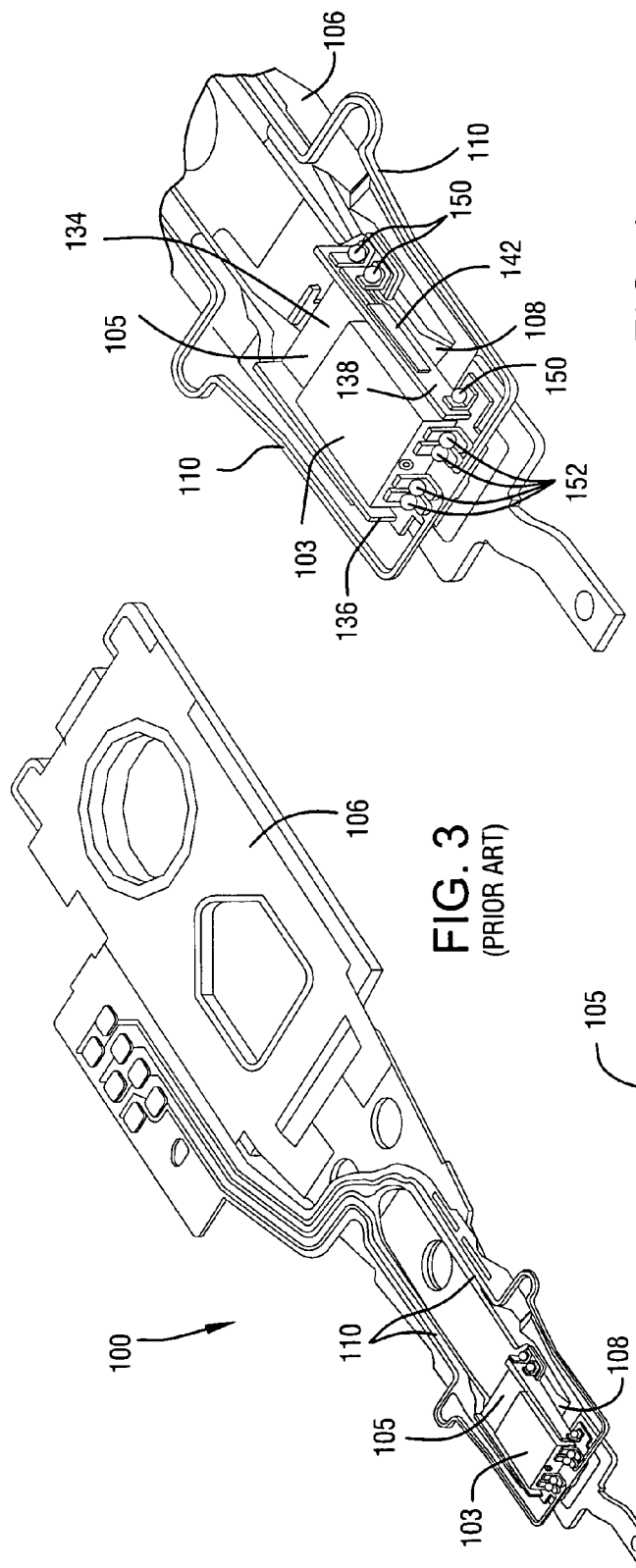

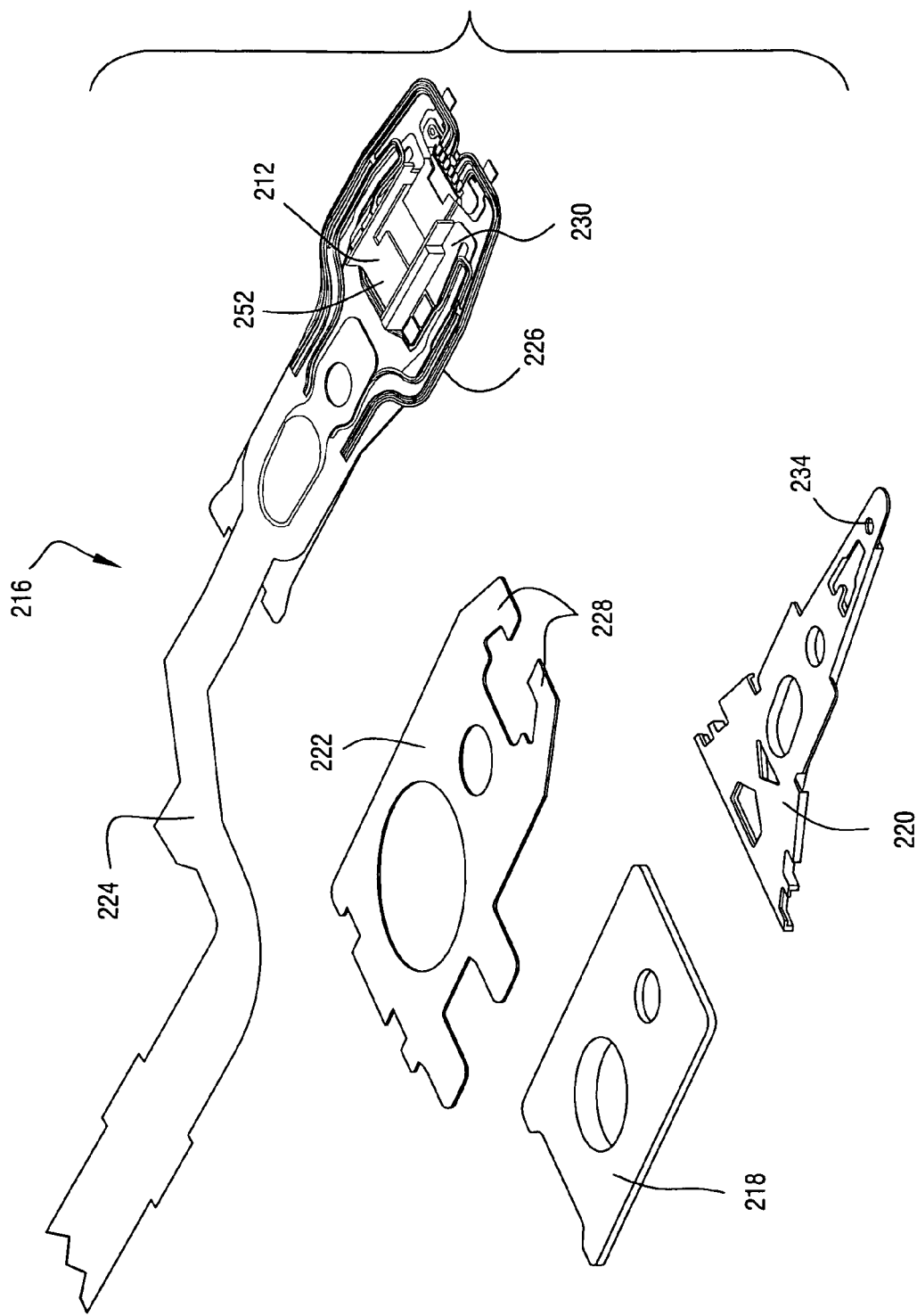

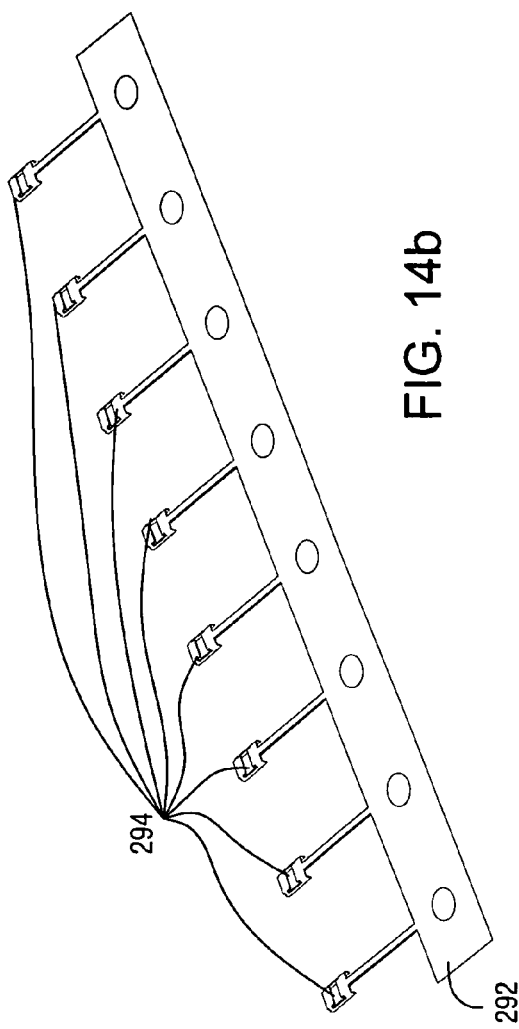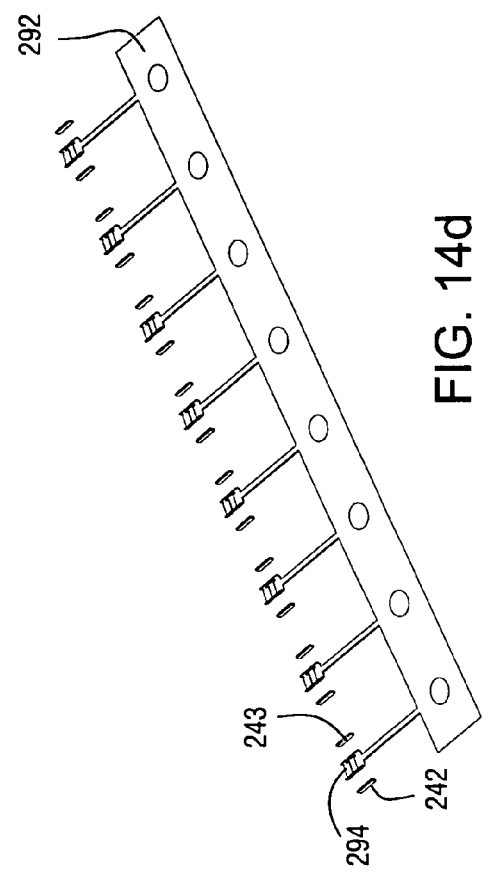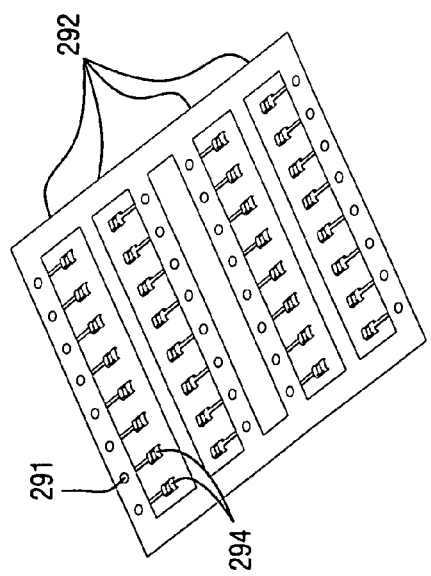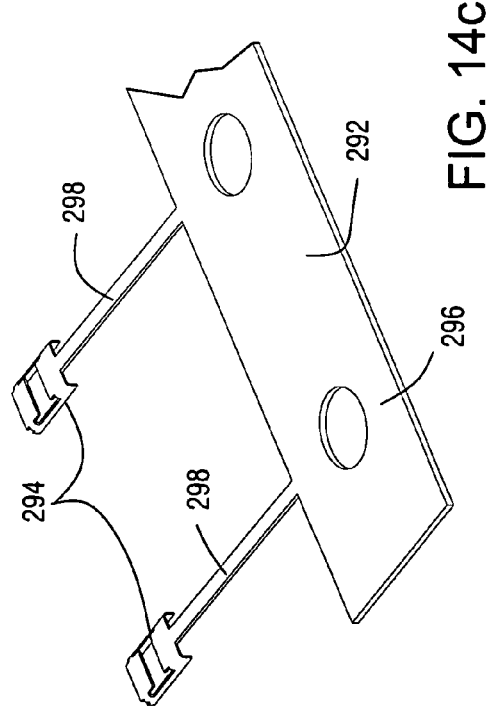
FIG. 14b
FIG. 14d
FIG. 14a
FIG. 14c

METHOD AND SYSTEM OF USING A STEP PLATE MECHANICALLY FORMED IN A DISK DRIVE SUSPENSION FLEXURE TO MOUNT A MICRO-ACTUATOR TO THE FLEXURE

FIELD OF THE INVENTION

The present invention relates to information recording disk drive devices and, more particularly, to a suspension and micro-actuator for a head gimbal assembly (HGA) of the disk drive device.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly." Other exemplary PZT micro-actuators are also disclosed in, for example, U.S. Pat. Nos. 6,671,131 and 6,700,749.

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101.

FIG. 3 illustrates the head gimbal assembly (HGA) 100 of the conventional disk drive device of FIGS. 1 and 2 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIGS. 3 and 4, the HGA 100 includes a suspension 106 having a suspension tongue 108 to load the PZT micro-actuator 105 and the slider 103. Suspension traces 110 are provided on opposite sides of the suspension tongue 108.

Referring to FIG. 5, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 mounted on an outer surface for actuation. The slider 103 is supported on the top support 132.

Referring to FIGS. 4 and 6, the PZT micro-actuator 105 is physically coupled to the suspension tongue 108 by the bottom support 134 of the frame 130. The bottom support 134 may be mounted on the suspension tongue 108 by epoxy 158. Multiple connection balls, e.g., three electrical connection balls 150 (gold ball bonding or solder ball bonding, GBB or SBB), are provided to couple the PZT micro-actuator 105 to the suspension traces 110 located at the side of each PZT element 140, 142. In addition, there are multiple connection balls, e.g., four electrical connection balls 152 (GBB or SBB), for coupling the slider 103 to the suspension traces 110 for electrical connection of the read/write transducers. When power is supplied through the suspension traces 110, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement or lateral translation of the slider 103 connected thereto, thereby making the slider 103 move on the track of the disk in order to fine tune the position of the read/write head. In this manner, controlled displacement of slider 103 can be achieved for fine positional tuning.

Referring to FIG. 6, the load beam 160 of the suspension 106 has a dimple 162 formed thereon that engages the suspension tongue 108. A parallel gap 170 is provided between the suspension tongue 108 and the top support 132 of the micro-actuator frame 130 to allow the PZT micro-actuator 105 and slider 103 to move smoothly and freely in use. The gap 170 is important for micro-actuator operation and HGA performance.

Maintaining the parallel gap 170 is difficult when the micro-actuator 105 is assembled to the suspension 106. Since epoxy 158 is a soft material, the epoxy 158 may cause the micro-actuator 105 to tilt, e.g., gap 170 between the tongue 108 and micro-actuator 105 becomes smaller. The frame tilt will affect HGA performance, such as the pitch angle, roll angle, or interference between the micro-actuator and the suspension tongue. In addition, the frame tilt will affect HGA manufacturing costs.

Thus, there is a need for an improved system that does not suffer from the above-mentioned drawbacks.

SUMMARY OF THE INVENTION

One aspect of the present invention relates to a head gimbal assembly including a suspension including a suspension flexure. The suspension flexure includes a step plate mechanically formed in the suspension flexure. A micro-actuator is mounted to the step plate of the suspension flexure. The step plate is constructed and arranged to support the micro-actuator such that a substantially constant gap is maintained between a top support of the micro-actuator and the suspension flexure in use.

Another aspect of the invention relates to a disk drive device including a head gimbal assembly, a drive arm connected to the head gimbal assembly, a disk, and a spindle motor operable to spin the disk. The head gimbal assembly includes a suspension including a suspension flexure. The suspension flexure includes a step plate mechanically formed in the suspension flexure. A micro-actuator is mounted to the step plate of the suspension flexure. The step plate is constructed and arranged to support the micro-actuator such that a substantially constant gap is maintained between a top support of the micro-actuator and the suspension flexure in use.

Yet another aspect of the invention relates to a method for manufacturing a head gimbal assembly. The method includes forming a metal sheet that includes multiple interconnected row bars with each row bar including multiple interconnected frame units, cutting a single row bar from the metal sheet, forming the frame unit into a micro-actuator frame, attaching PZT elements to the micro-actuator frame, cutting the frame from the single row bar, preparing a suspension flexure of a suspension, forming a step plate in the suspension flexure, laser welding the frame to the step plate of the suspension flexure, preparing a base plate, load beam, and hinge of the suspension, assembling the suspension by mounting the base plate, load beam, hinge, and flexure to one another, visually inspecting the suspension, and packing the suspension.

Yet another aspect of the invention relates to a method for manufacturing a head gimbal assembly. The method including forming a metal sheet that includes multiple interconnected row bars with each row bar including multiple interconnected frame units, cutting a single row bar from the metal sheet, forming the frame unit into a micro-actuator frame, cutting the frame from the single row bar, preparing a suspension flexure of a suspension, forming a step plate in the suspension flexure, laser welding the frame to the step plate of the suspension flexure, preparing a base plate, load beam, and hinge of the suspension, assembling the suspension by mounting the base plate, load beam, hinge, and flexure to one another, attaching PZT elements to the micro-actuator frame on the assembled suspension, visually inspecting the suspension, and packing the suspension.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a perspective view of a conventional head gimbal assembly (HGA);

FIG. 4 is an enlarged, partial perspective view of the HGA shown in FIG. 3;

FIG. 5 is a perspective view of a slider and PZT micro-actuator of the HGA shown in FIG. 3;

FIG. 6 is a partial cross-sectional view of the HGA shown in FIG. 3;

FIG. 10 is an exploded view of the HGA shown in FIG. 7;

FIGS. 14a-14e are sequential views illustrating the manufacturing process shown in FIG. 13;

DETAILED DESCRIPTION OF ILLUSTRATED EMBODIMENTS

Figure 1:
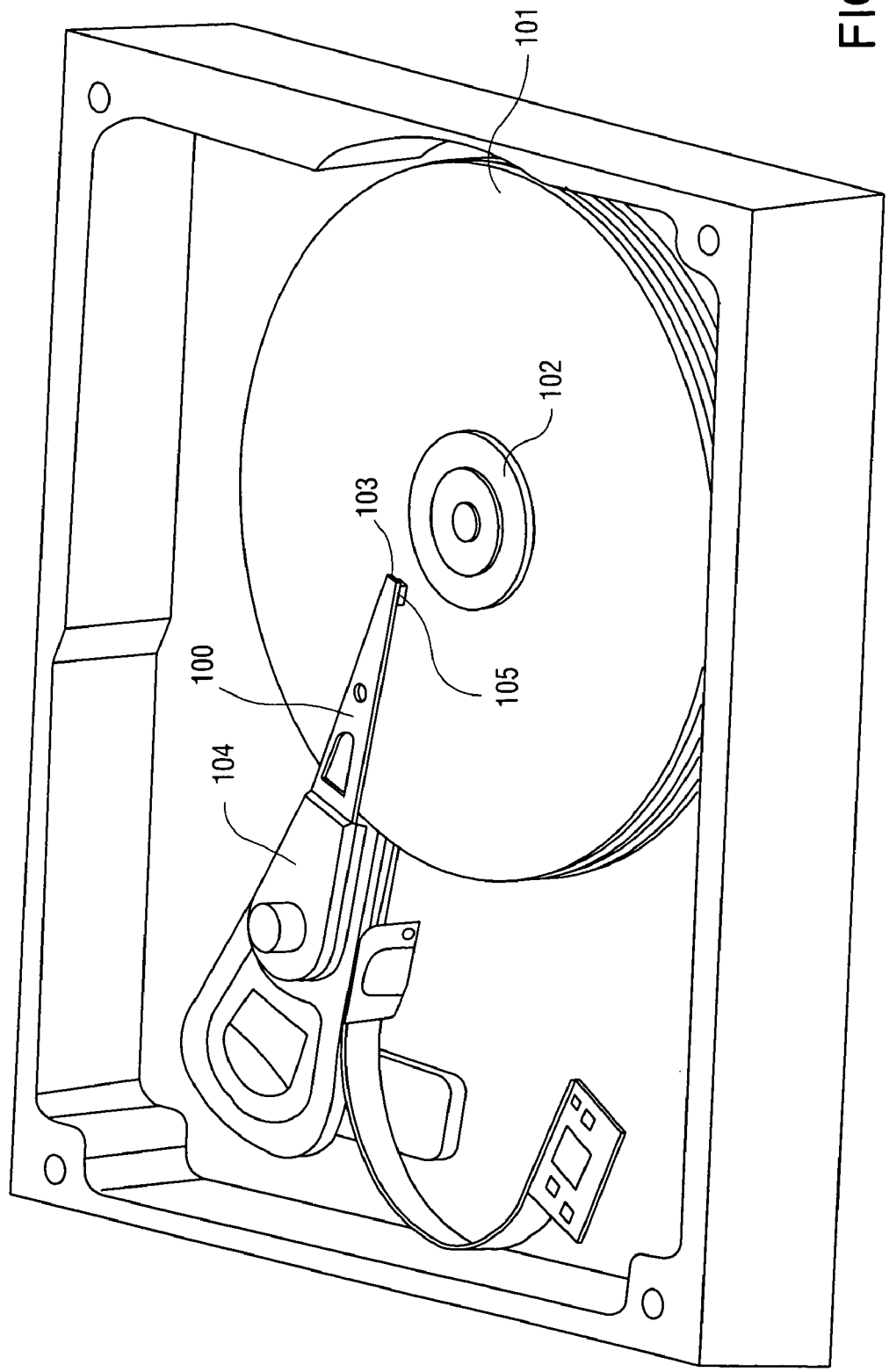
FIG. 1 is a perspective view of a conventional disk drive unit.
Figure 2:
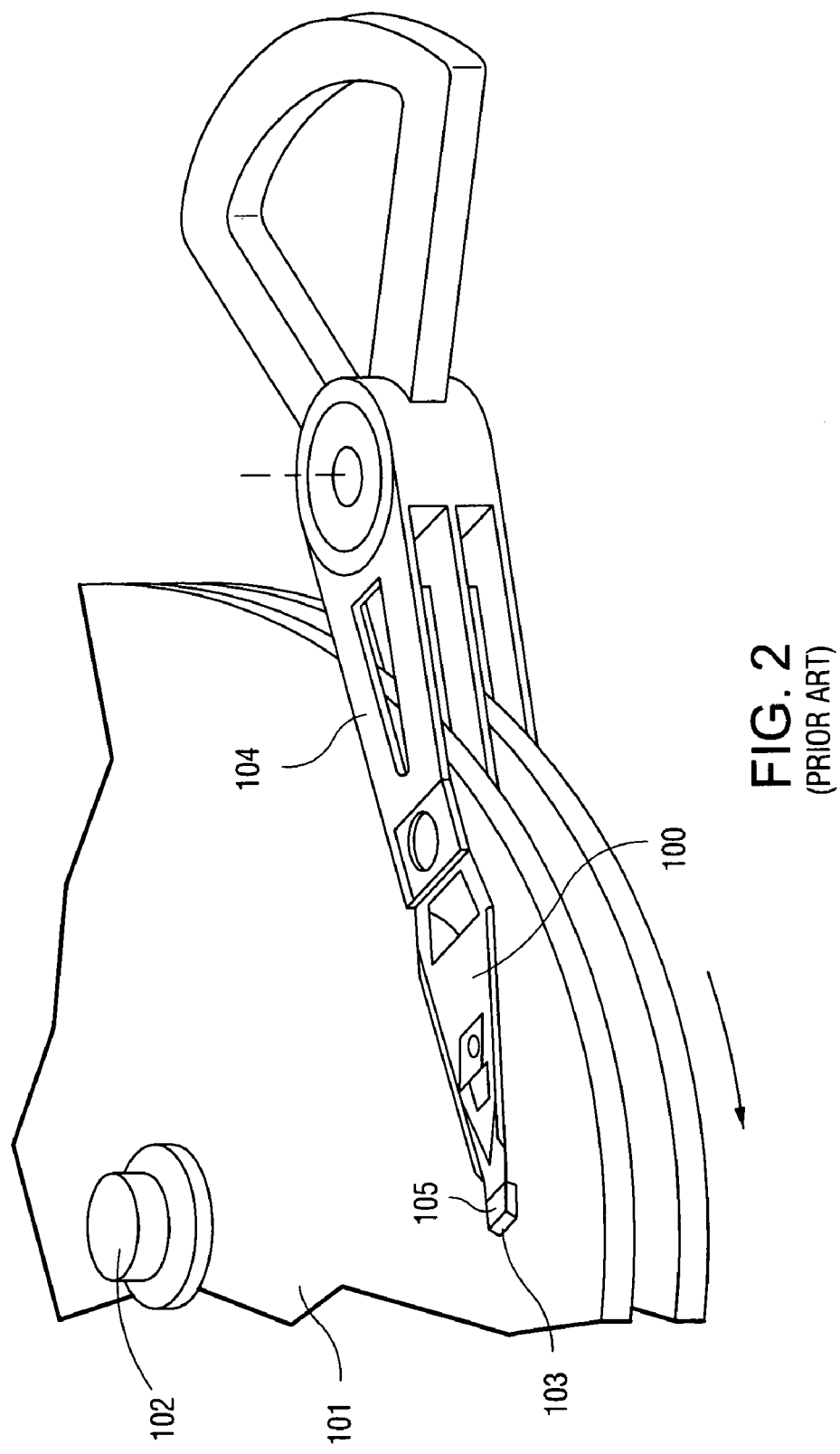
FIG. 2 is a partial perspective view of the conventional disk drive unit shown in FIG. 1.

Various embodiments of the present invention will now be described with reference to the figures, wherein like reference numerals designate similar parts throughout the various views. An aspect of the present invention is to provide parallel gap control between the micro-actuator and suspension tongue while precisely actuating the slider using the micro-actuator. By controlling the parallel gap between the micro-actuator and the suspension tongue, the PSA (pitch static attitude) and RSA (roll static attitude) of the HGA and interference problems are improved. In addition, the manufacturing process is simplified and costs are reduced.

An exemplary embodiment of a HGA will now be described. It is noted that the micro-actuator mounting arrangement may be implemented in any suitable disk drive device having a micro-actuator in which it is desired to improve parallel gap control, regardless of the specific structure of the HGA as illustrated in the figures. That is, the invention may be used in any suitable device having a micro-actuator in any industry.

Figure 7:
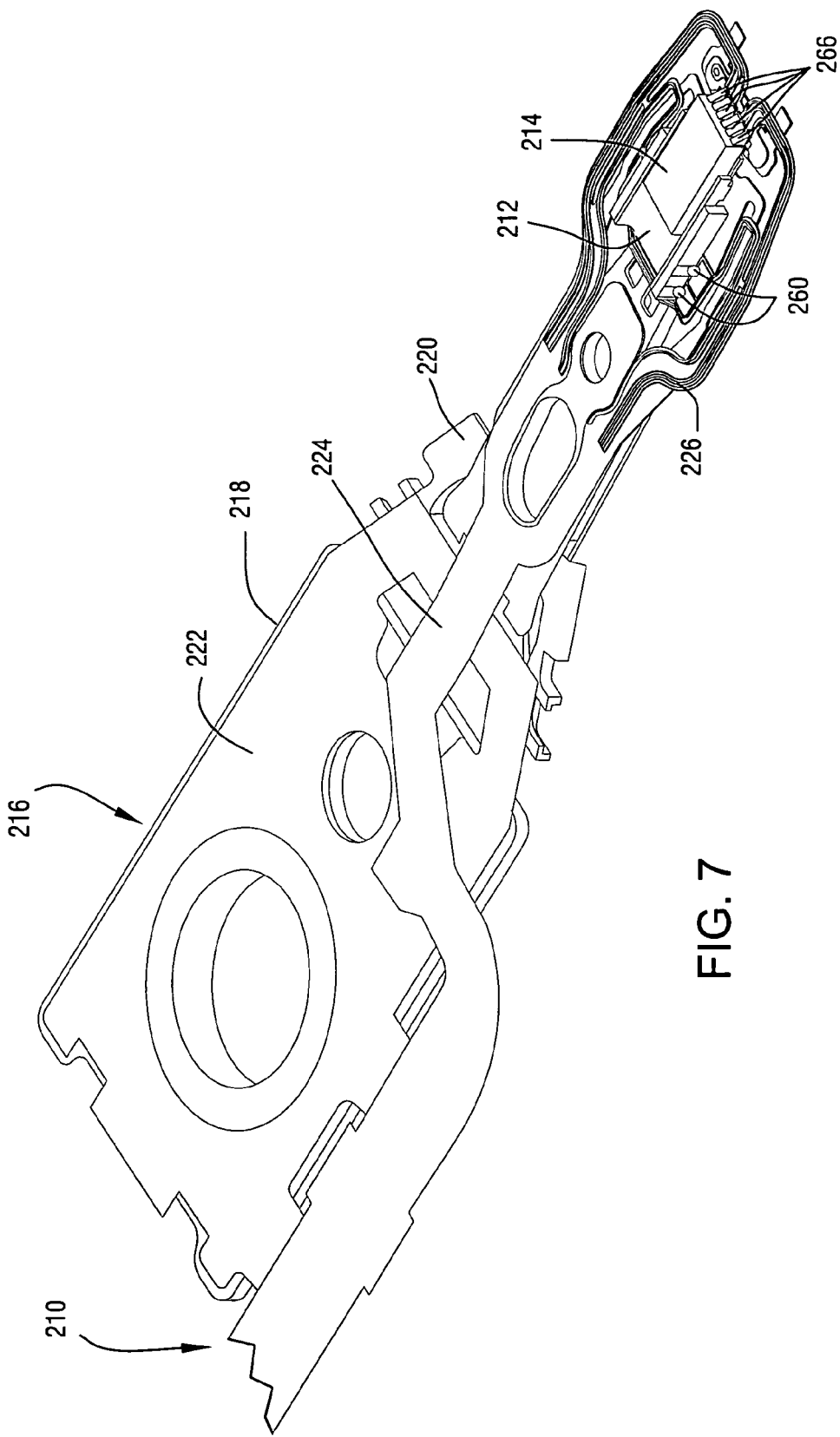
FIG. 7 is a perspective view of a head gimbal assembly (HGA) according to an embodiment of the present invention.
Figure 8:
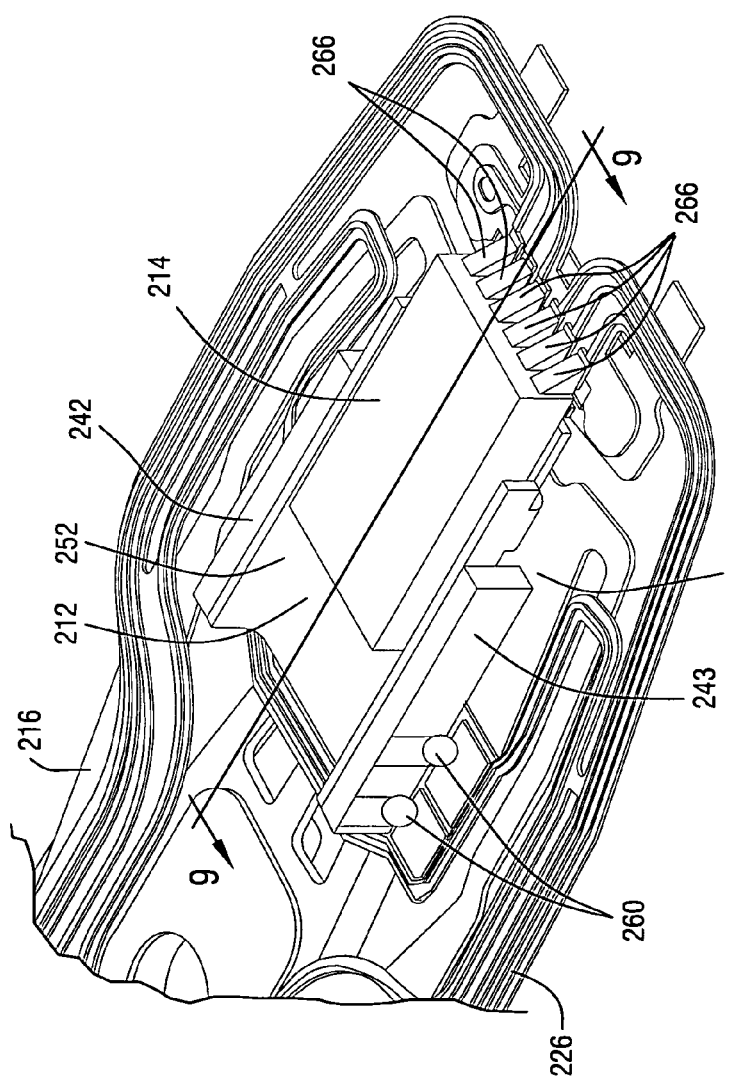
FIG. 8 is an enlarged, partial perspective view of the HGA shown in FIG. 7.
Figure 9:
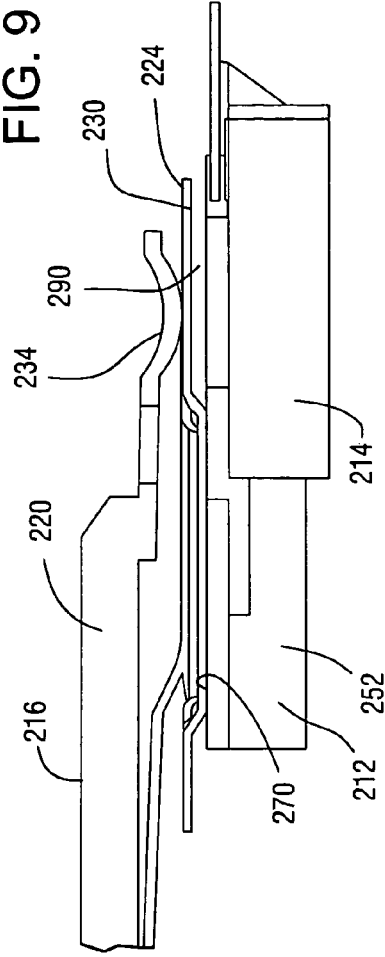
FIG. 9 is a cross-sectional view through line 9-9 of FIG. 8.

FIGS. 7-9 illustrate a head gimbal assembly (HGA) 210 including a micro-actuator mounting arrangement according to an embodiment of the present invention. The HGA 210 includes a PZT micro-actuator 212, a slider 214, and a suspension 216 to support the PZT micro-actuator 212 and the slider 214.

As best shown in FIGS. 7 and 10, the suspension 216 includes a base plate 218, a load beam 220, a hinge 222, a flexure 224, and suspension traces 226 in the flexure 224. The base plate 218 is constructed of a relatively hard or rigid material, e.g., metal, to stably support the suspension 216 on a drive arm of a voice coil motor (VCM).

The hinge 222 is mounted onto the base plate 218 and load beam 220, e.g., by welding. As illustrated, the hinge 222 includes a holder bar 228 for supporting the load beam 220.

The load beam 220 is mounted onto the hinge 222, e.g., by welding. The load beam 220 has a dimple 234 formed thereon for engaging the flexure 224 (also see FIG. 9).

The flexure 224 is mounted to the hinge 222 and the load beam 220, e.g., by welding. The flexure 224 provides a suspension tongue 230 to support the PZT micro-actuator 212 on the suspension 216. The dimple 234 on the load beam 220 engages and supports the suspension tongue 230. Also, the suspension traces 226 are provided on the flexure 224 to electrically connect an external control system with the slider 214 and the PZT elements 242, 243 on the PZT micro-actuator 212.

In an embodiment, the PZT micro-actuator 212 is first mounted to the suspension tongue 230 of the flexure 224, e.g., by laser welding, and then the flexure 224 is mounted to the other suspension components, i.e., the base plate 218, load beam 220, and hinge 222. This provides the suspension 216 with an integrated PZT micro-actuator 212.

Figure 11A:
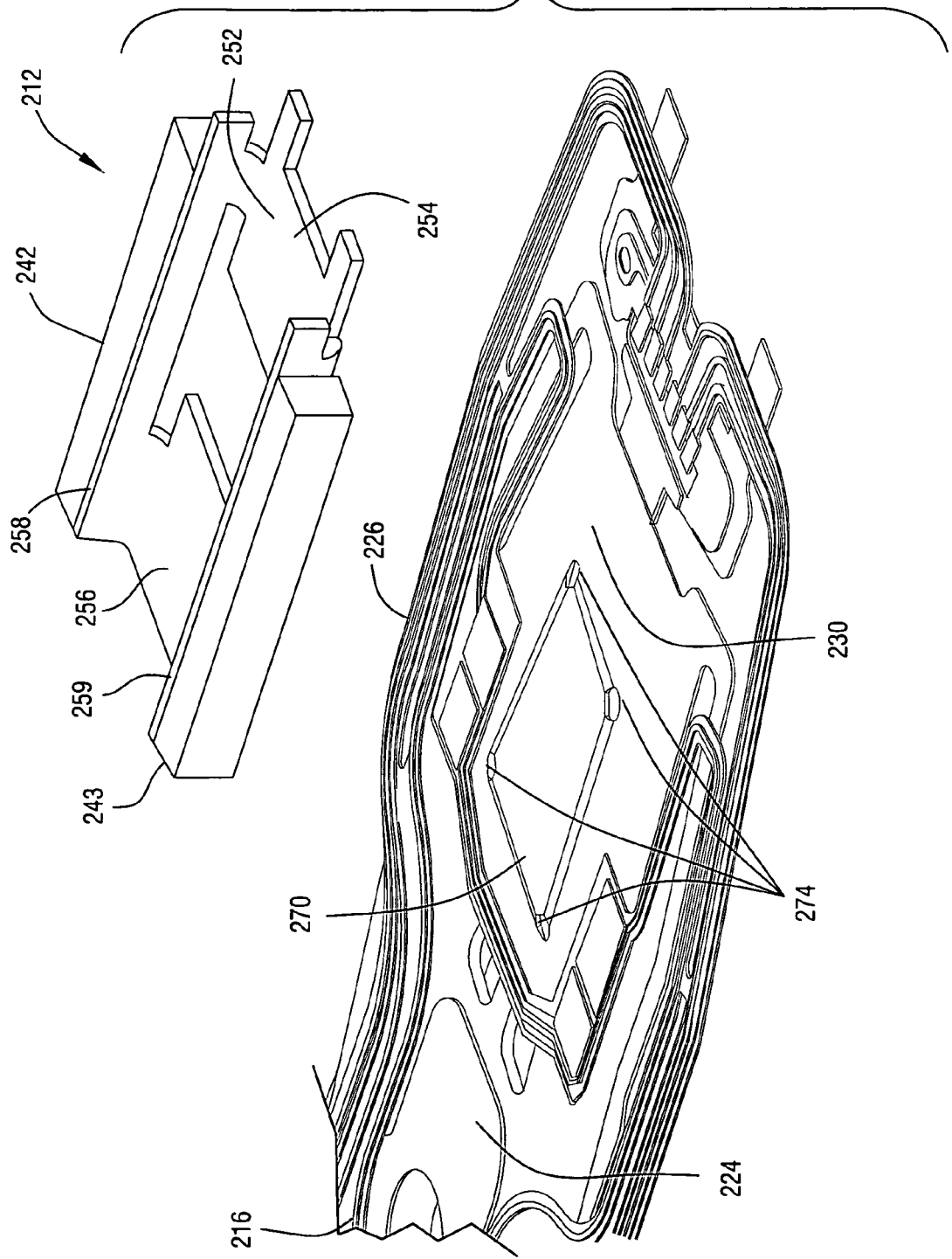
FIGS. 11a-11c are perspective views illustrating welding process for attaching micro-actuator to suspension tongue according to an embodiment of the present invention.

As best shown in FIG. 11a, the PZT micro-actuator 212 includes a micro-actuator frame 252 and PZT elements 242, 243 mounted to respective side arms of the frame 252.

The frame 252 includes a top support 254, a bottom support 256, and side arms 258, 259 that interconnect the top support 254 and bottom support 256. The frame 252 is preferably constructed of a metal material, however other suitable materials are possible.

A PZT element 242, 243 is mounted to an outwardly facing surface of a respective side arm 258, 259 of the frame 252. Each PZT element 242, 243 is electrically connected to the suspension traces 226 using, for example, electrical connection balls (GBB or SBB) 260.

Figure 11B:
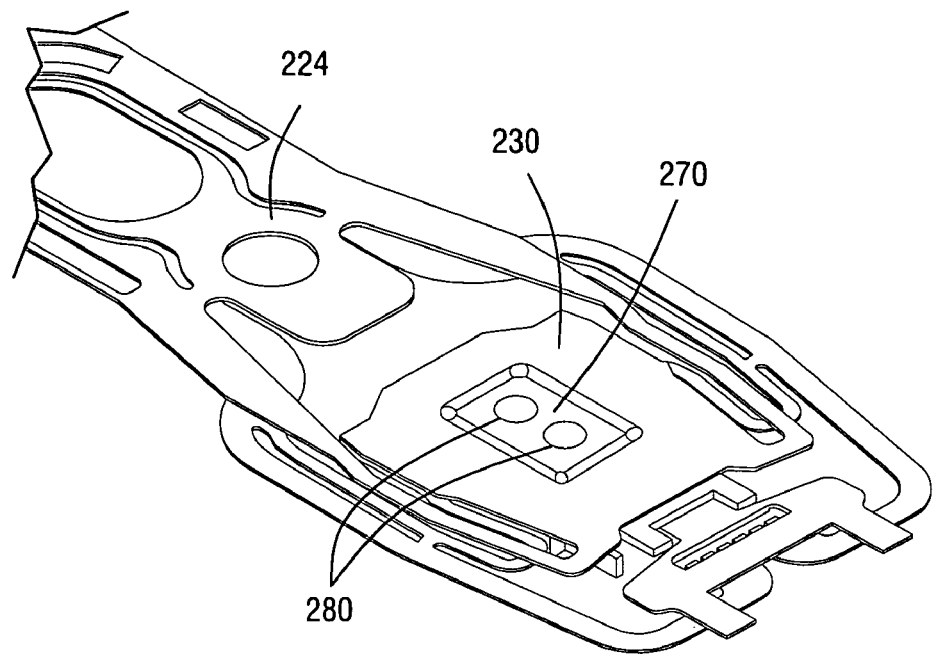
Figure 11C:
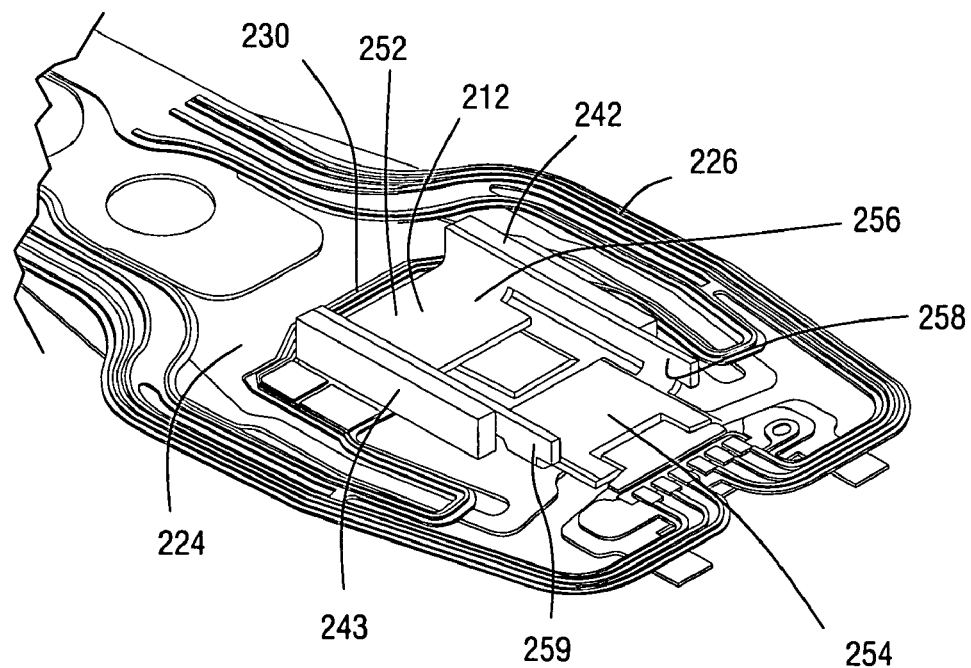

As best shown in FIGS. 9 and 11a-11c, the bottom support 256 is structured to connect the micro-actuator frame 252 to the suspension 216. Specifically, a step plate or support step 270 is formed in the suspension tongue 230 of the suspension 216. The bottom support 256 is mounted to step plate 270 by welding, e.g., laser welding. As shown in FIG. 11b (which is a back side of the flexure 224 in the area of tongue 230), laser welding is performed on a back side of the step plate 270. In the illustrated embodiment, the bottom support 256 is welded to the step plate 270 by a plurality of laser dots 280, e.g., two laser dots. Because the welding is performed from the back side of the flexure 224, there are no welding marks on a top side of the PZT micro-actuator 212 (which is located on a top side of the flexure 224), as shown in FIG. 11c. In another embodiment, laser welding may also be performed on a top side of the step plate 270 that supports the bottom support 256 of the micro-actuator. The welding method is the same as welding from the back side.

As best shown in FIG. 9, this mounting arrangement connects the bottom support 256 to the suspension tongue 230 and provides a parallel gap 290 between the suspension tongue 230 and the top support 254 of the micro-actuator frame 252 to allow the PZT micro-actuator 212 and slider 214 to move smoothly and freely in use.

Figure 12A:
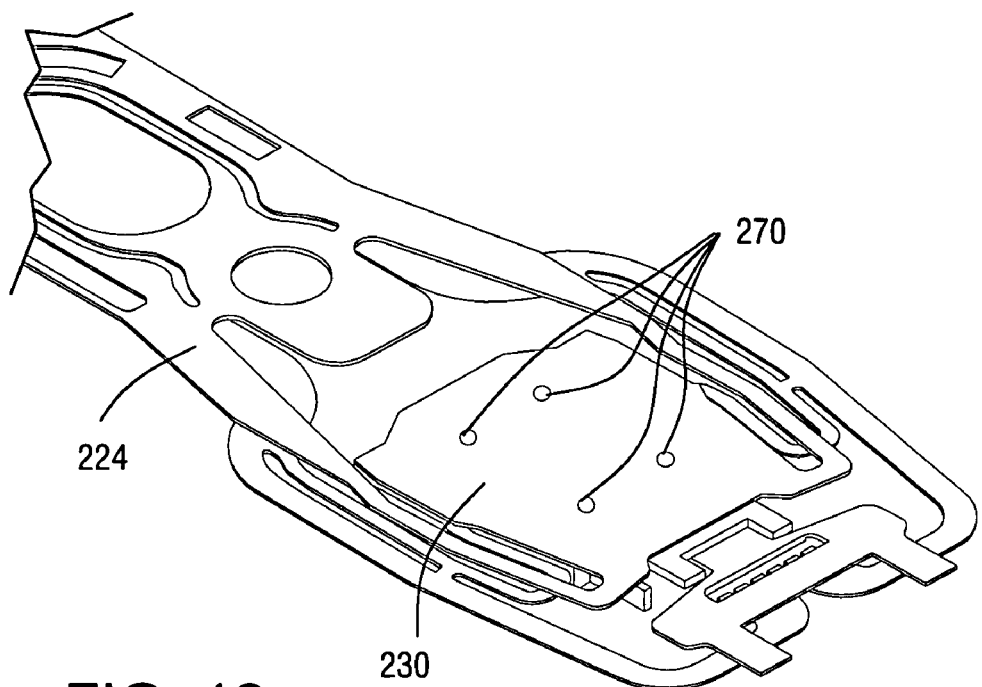
FIGS. 12a-12d are perspective views illustrating manufacturing process for forming step plate in suspension tongue according to an embodiment of the present invention.
Figure 12B:
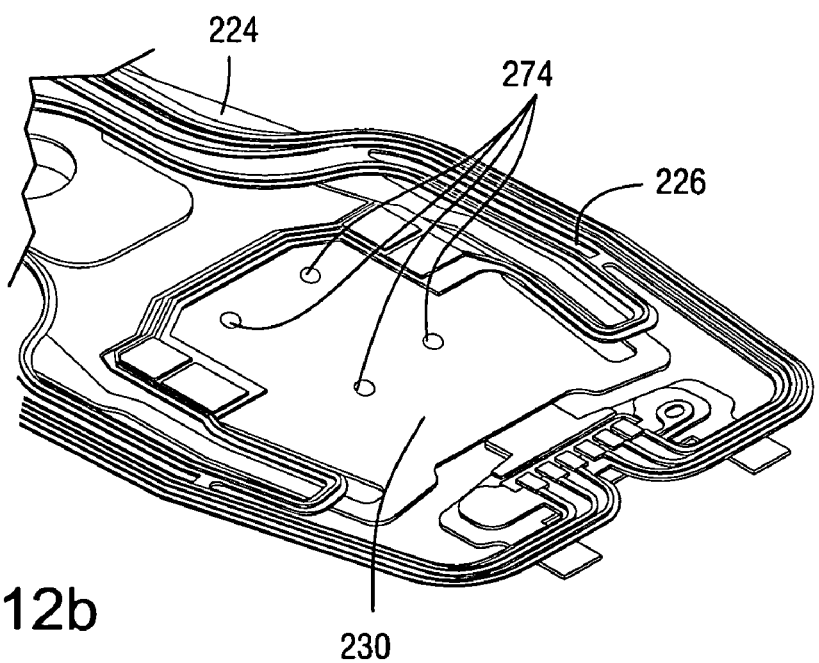
Figure 12C:
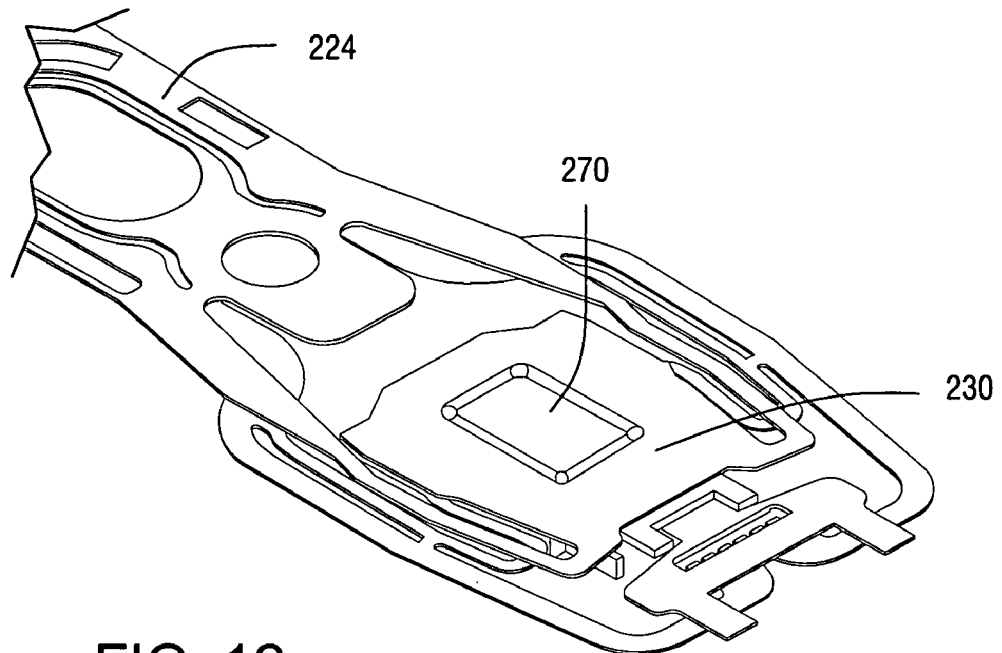
Figure 12D:
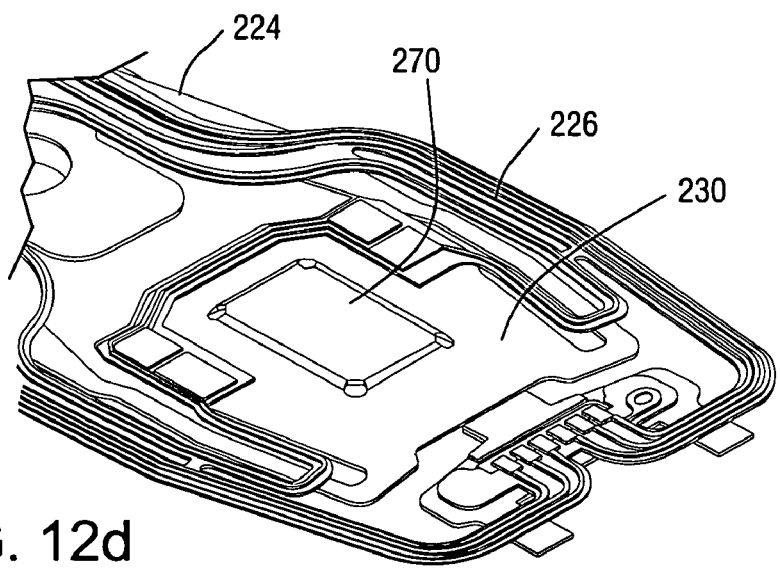

FIGS. 12a-12d illustrate an exemplary process for forming the step plate 270 in the suspension tongue 230. The step plate 270 may be mechanically formed in the suspension tongue 230, e.g., by a punching method. For example, as shown in FIGS. 12a and 12b (which show back and top sides, respectively, of the flexure 224 in the area of tongue 230), four holes 274 may be chemically etched in the tongue 230. The four holes 274 facilitate forming the step plate 270 with a perfect box or square shape. Then, as shown in FIGS. 12c and 12d (which show back and top sides, respectively, of the flexure 224 in the area of tongue 230), the step plate 270 is punched in the suspension tongue 230. The step plate 270 may have a height in the range of 35-50 μm.

In the illustrated embodiment, the step plate 270 has a general square shape. However, the step plate may have other suitable shapes, e.g., triangular shape, trapezoid shape, circle shape, or a combination of the square and circle shape. Also, the forming edge of the step plate may have a slope edge, round edge, etc. In addition, multiple holes may be chemically etched in the tongue 230 to form the step plate 270 with a substantially perfect box.

This mounting arrangement of the micro-actuator frame 252, i.e., mechanically formed step plate 270 in suspension tongue 230 and laser welding of the micro-actuator frame 252 to the step plate, maintains a substantially constant gap 290 between the micro-actuator frame 252 and the suspension tongue 230 in use. That is, the gap control will improve in comparison to epoxy mounting. The gap size is also easy to control, e.g., by controlling the height of the step plate 270. In addition, since the mounting process may be integrated into the suspension manufacturing process, costs may be effectively reduced.

Further, by controlling the parallel gap, the PSA (pitch static attitude) and RSA (roll static attitude) of the HGA and interference problems may be improved. Thus, micro-actuator and HGA performance is improved.

The top support 254 is structured to connect the frame 252 to the slider 214. Specifically, the slider 214 is mounted on the top support 254, e.g., by epoxy. The slider 214 is electrically connected to the suspension traces 226 using, for example, electrical connection balls (GBB or SBB) 266.

In use, the PZT elements 242, 243 are excited, e.g., by applying voltage thereto via suspension traces 226, to selectively cause expansion or contraction thereof. The PZT micro-actuator 212 is configured such that expansion or contraction of the PZT elements 242, 243 causes movement of the side arms 258, 259, which causes movement of the top support 254, which, in turn, causes movement of the slider 214 coupled thereto.

Figure 13:
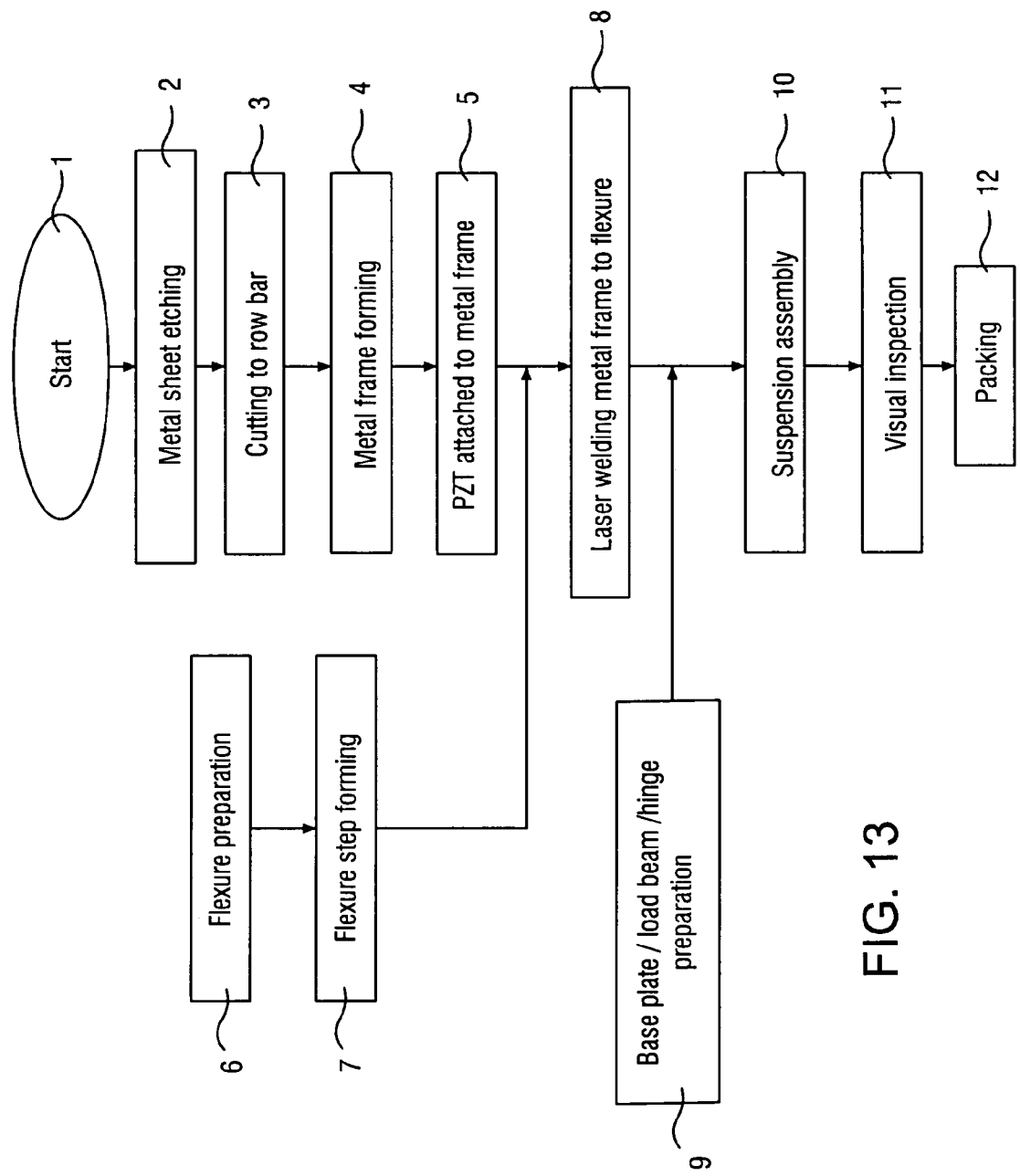
FIG. 13 is a flow chart illustrating a manufacturing process according to an embodiment of the present invention.
Figure 14E:
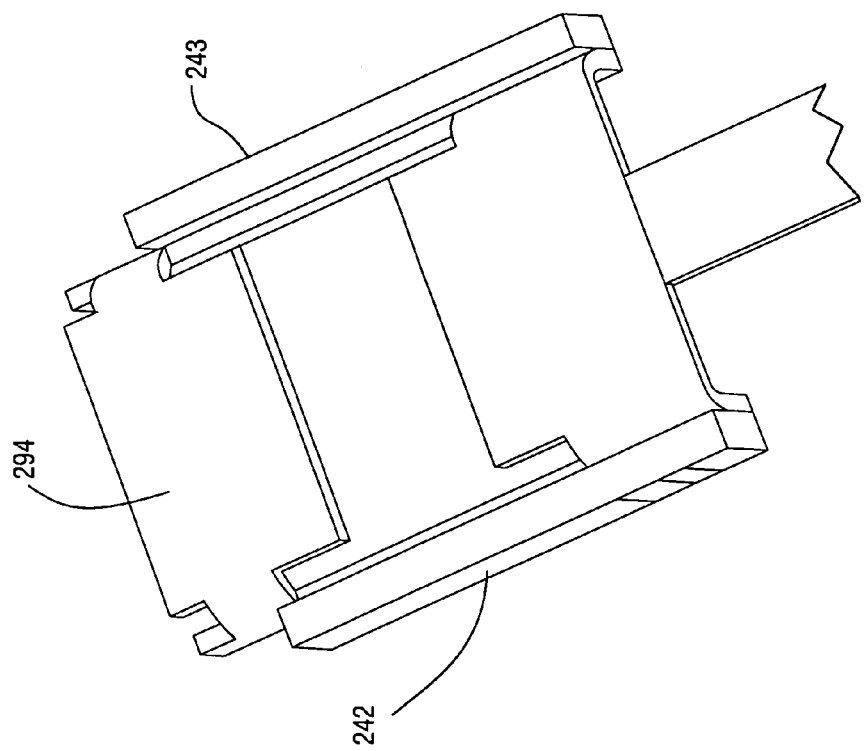

FIGS. 13, 14a-14e, and 15a-15e illustrate the primary steps involved in a manufacturing process of the HGA 210 according to an embodiment of the present invention. After the process starts (step 1 in FIG. 13), a metal sheet 291 including multiple rows 292, e.g., row bars, of interconnected frame units 294 is formed, e.g., by etching (step 2 in FIG. 13), as shown in FIG. 14a.

In the illustrated embodiment, the metal sheet 291 includes four interconnected rows 292, with each row 292 including eight interconnected frame units 294. However, the metal sheet 290 may include other suitable numbers of rows 292 and frame units 294.

Next, as shown in FIG. 14b, a single row bar 292 is cut from the sheet 291 (step 3 in FIG. 13). As best shown in FIG. 14c, each frame unit 294 is coupled to a common base 296 by a beam 298. Then, metal frame forming occurs (step 4 in FIG. 13), and PZT elements 242, 243 are attached to the metal frame (step 5 in FIG. 13), as shown in FIGS. 14d and 14e. Next, a single frame unit 294 is cut from the single row bar 292. As illustrated, the single frame unit 294 is formed into a micro-actuator frame 252 of the type described above.

Figure 15A:
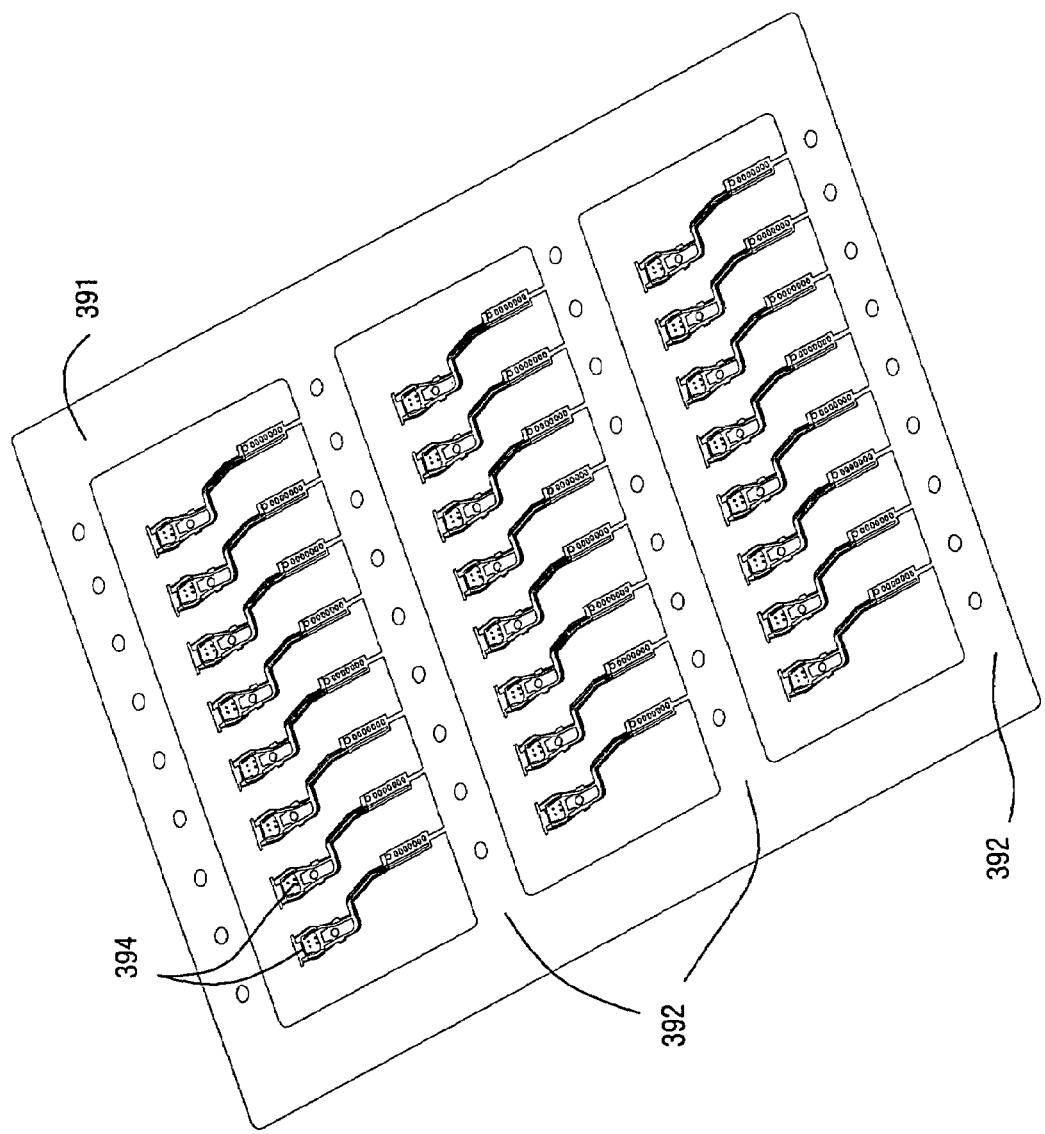
FIGS. 15a-15e are sequential views illustrating the manufacturing process shown in FIG. 13.

At step 6 in FIG. 13, flexure preparation occurs. This may include forming, e.g., by etching, a metal sheet 391 including multiple rows 392, e.g., row bars, of interconnected flexure units 394 (as shown in FIG. 15a) and cutting a single row bar 392 from the sheet 391 (as shown in FIG. 15b).

Figure 15C:
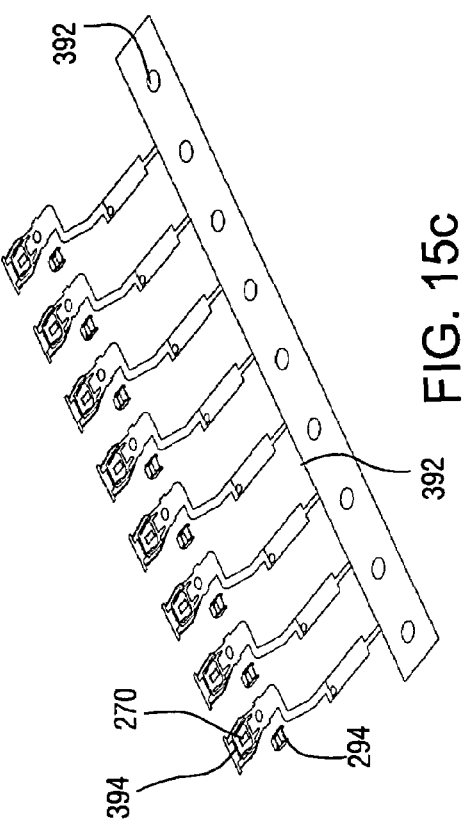
Figure 15D:
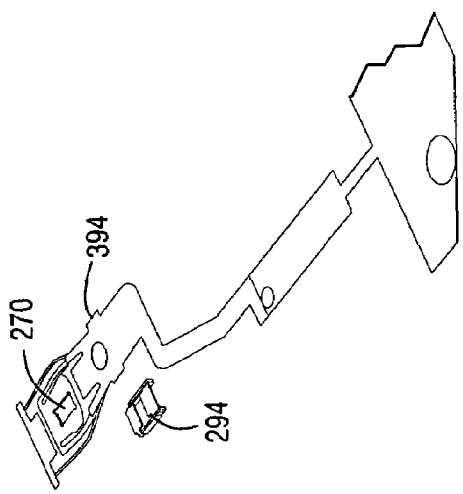
Figure 15B:
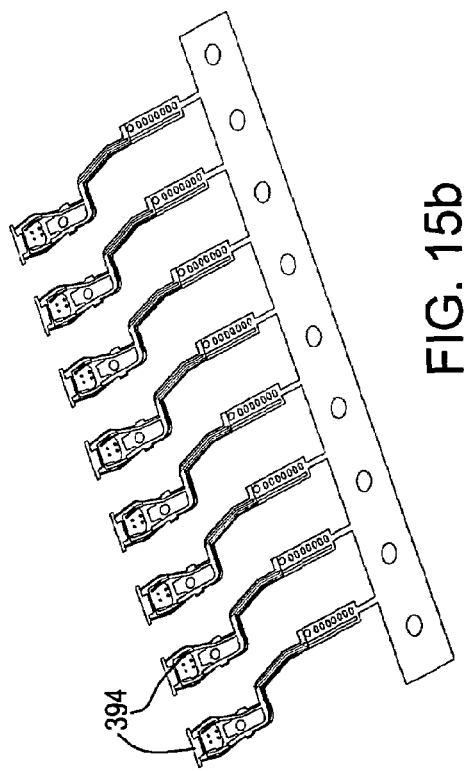
Figure 15E:
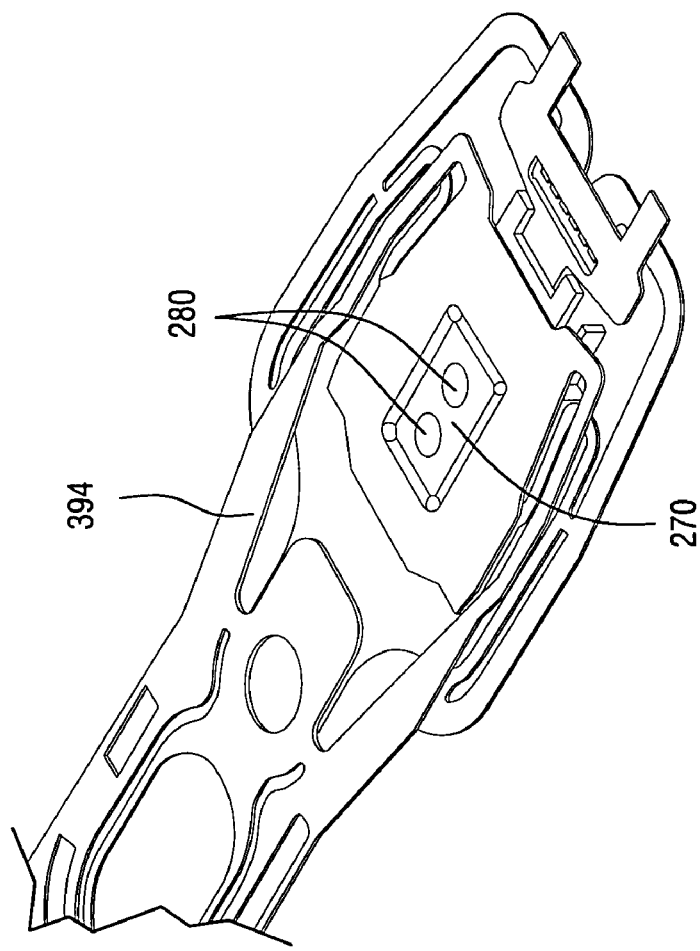

Next, as shown in FIGS. 15c and 15d, the step plate 270 is formed in the flexure for mounting a frame unit 294 (step 7 in FIG. 13). Then, the frame unit 294 is laser welded, e.g., by laser dots 280, to the flexure in a manner as described above (step 8 in FIG. 13), as shown in FIG. 15e.

At step 9 in FIG. 13, the base plate, load beam, and hinge of the suspension are prepared. The, the suspension is assembled (step 10 in FIG. 13), which includes mounting the flexure, base plate, load beam, and hinge to one another, e.g., by laser welding. A visually inspection is completed (step 11 in FIG. 13), and the HGA is packaged (step 12 in FIG. 13) to complete the manufacturing process.

Figure 16:
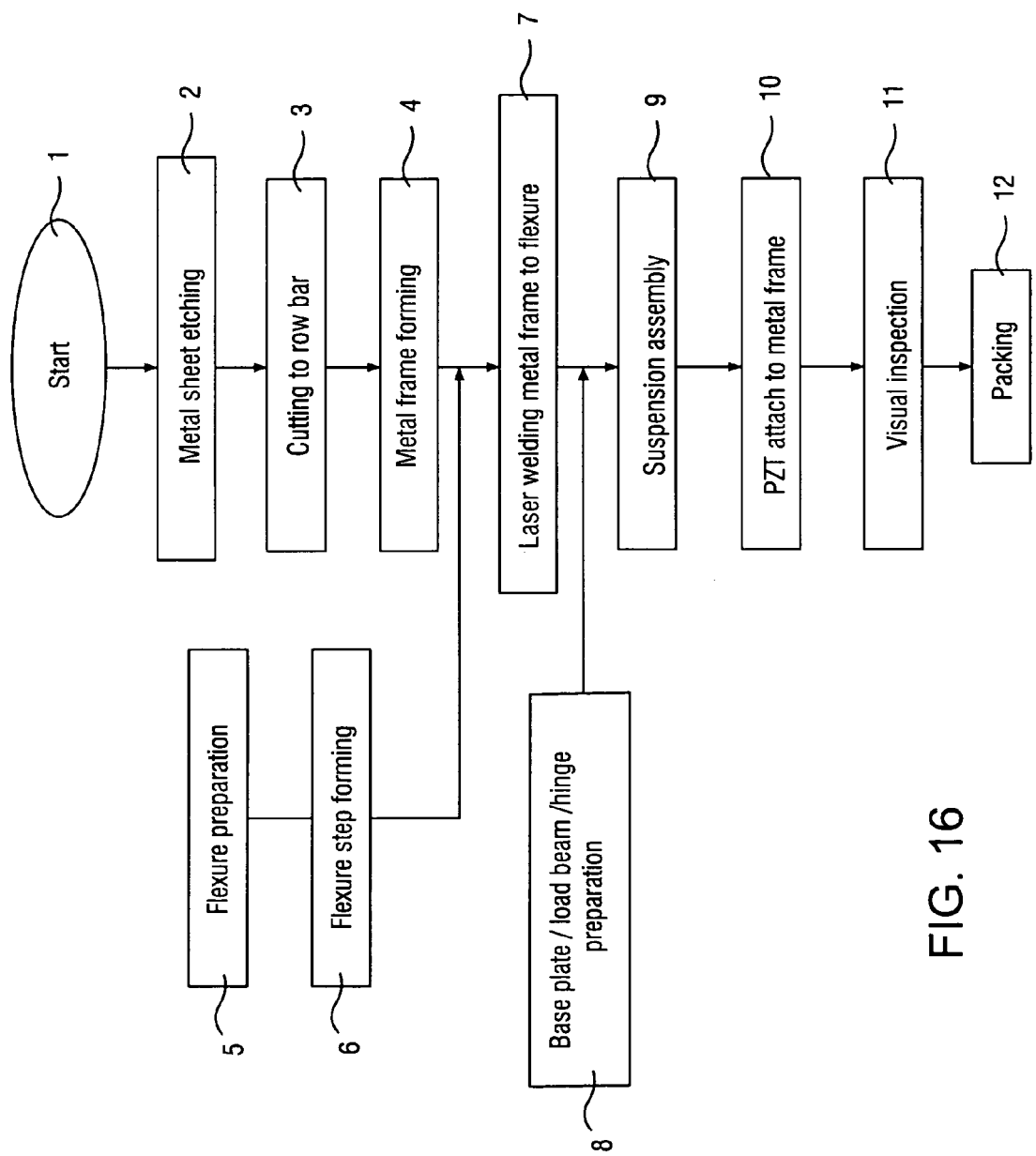
FIG. 16 is a flow chart illustrating a manufacturing process according to another embodiment of the present invention.

FIG. 16 illustrates the primary steps involved in a manufacturing process of the HGA 210 according to another embodiment of the present invention. The process of FIG. 16 is similar to that described in FIG. 13. In contrast, the PZT elements are attached to the metal frame after the suspension is assembled.

The head gimbal assembly 210 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly comprising:
    a suspension including a suspension flexure, the suspension flexure including a step plate mechanically formed in the suspension flexure; and
    a micro-actuator mounted to the step plate of the suspension flexure,
    wherein the step plate is constructed and arranged to support the micro-actuator such that a substantially constant gap is maintained between a top support of the micro-actuator and the suspension flexure in use.

2. The head gimbal assembly according to claim 1, wherein the step plate is formed in a suspension tongue of the suspension flexure.

3. The head gimbal assembly according to claim 1, wherein the micro-actuator includes a metal frame including a bottom support mounted to the step plate, the top support adapted to support a slider, and a pair of side arms that interconnect the bottom support and the top support.

4. The head gimbal assembly according to claim 3, wherein the bottom support is laser welded to the step plate.

5. The head gimbal assembly according to claim 4, wherein the bottom support is laser welded to the step plate by a plurality of laser dots.

6. The head gimbal assembly according to claim 4, wherein the laser welding is performed on a back side of the step plate which is opposite a top side of the step plate that supports the bottom support.

7. The head gimbal assembly according to claim 4, wherein the laser welding is performed on a top side of the step plate that supports the bottom support.

8. The head gimbal assembly according to claim 1, wherein the step plate is mechanically formed in the suspension flexure by a punching method.

9. The head gimbal assembly according to claim 1, wherein the step plate has a square shape, triangle shape, trapezoid shape, circle shape, or a combination of the square and circle shape.

10. The head gimbal assembly according to claim 9, wherein multiple holes are etched in the suspension flexure to form the step plate.

11. The head gimbal assembly according to claim 1, wherein the step plate has a slope edge or round edge.

12. The head gimbal assembly according to claim 1, wherein the step plate has a height in the range of 35-50 μm.

13. A disk drive device comprising:
    a head gimbal assembly;
    a drive arm connected to the head gimbal assembly;
    a disk; and
    a spindle motor operable to spin the disk,
    wherein the head gimbal assembly includes:
    a suspension including a suspension flexure, the suspension flexure including a step plate mechanically formed in the suspension flexure; and
    a micro-actuator mounted to the step plate of the suspension flexure,
    wherein the step plate is constructed and arranged to support the micro-actuator such that a substantially constant gap is maintained between a top support of the micro-actuator and the suspension flexure in use.

14. The disk drive device according to claim 13, wherein the step plate is formed in a suspension tongue of the suspension flexure.

15. The disk drive device according to claim 13, wherein the micro-actuator includes a metal frame including a bottom support mounted to the step plate, the top support adapted to support a slider, and a pair of side arms that interconnect the bottom support and the top support.

16. The disk drive device according to claim 15, wherein the bottom support is laser welded to the step plate.

17. The disk drive device according to claim 16, wherein the bottom support is laser welded to the step plate by a plurality of laser dots.

18. The disk drive device according to claim 16, wherein the laser welding is performed on a back side of the step plate which is opposite a top side of the step plate that supports the bottom support.

19. The disk drive device according to claim 16, wherein the laser welding is performed on a top side of the step plate that supports the bottom support.

20. The disk drive device according to claim 13, wherein the step plate is mechanically formed in the suspension flexure by a punching method.

21. The disk drive device according to claim 13, wherein the step plate has a square shape, triangle shape, trapezoid shape, circle shape, or a combination of the square and circle shape.

22. The disk drive device according to claim 21, wherein multiple holes are etched in the suspension flexure to form the step plate.

23. The disk drive device according to claim 13, wherein the step plate has a slope edge or round edge.

24. The disk drive device according to claim 13, wherein the step plate has a height in the range of 35-50 µm.

25. A method for manufacturing a head gimbal assembly, the method comprising:
    forming a metal sheet that includes multiple interconnected row bars with each row bar including multiple interconnected frame units;
    cutting a single row bar from the metal sheet;
    forming the frame unit into a micro-actuator frame;
    attaching PZT elements to the micro-actuator frame;
    cutting the frame from the single row bar;
    preparing a suspension flexure of a suspension;
    forming a step plate in the suspension flexure;
    laser welding the frame to the step plate of the suspension flexure;
    preparing a base plate, load beam, and hinge of the suspension;
    assembling the suspension by mounting the base plate, load beam, hinge, and flexure to one another;
    visually inspecting the suspension; and
    packing the suspension.

26. The method according to claim 25, wherein forming a metal sheet includes forming a metal sheet by etching.

27. A method for manufacturing a head gimbal assembly, the method comprising:
    forming a metal sheet that includes multiple interconnected row bars with each row bar including multiple interconnected frame units;
    cutting a single row bar from the metal sheet;
    forming the frame unit into a micro-actuator frame;
    cutting the frame from the single row bar;
    preparing a suspension flexure of a suspension;
    forming a step plate in the suspension flexure;
    laser welding the frame to the step plate of the suspension flexure;
    preparing a base plate, load beam, and hinge of the suspension;
    assembling the suspension by mounting the base plate, load beam, hinge, and flexure to one another;
    attaching PZT elements to the micro-actuator frame on the assembled suspension;
    visually inspecting the suspension; and
    packing the suspension.

* * * * *